Feb. 20, 1973 D. W. MOLINS ET AL 3,717,537

CONTINUOUS WEBS

Original Filed Feb. 13, 1968 10 Sheets-Sheet 1

INVENTORS
Desmond Walter Molins
Tony Rowland

BY Watson, Cole, Grindle + Watson
ATTORNEYS

Feb. 20, 1973 D. W. MOLINS ET AL 3,717,537

CONTINUOUS WEBS

Original Filed Feb. 13, 1968 10 Sheets-Sheet 2

INVENTORS

Desmond Walter Molins

Tom Rowlands

BY

Watson, Cole, Grindle + Watson

ATTORNEYS

INVENTORS
Desmond Walter Molins
Tom [illegible]
BY Watson, Cole, Grindle + Watson
ATTORNEYS INVENTORS
Desmond Walter Molins
Tom Rowlands
BY
Watson, Cole, Grindle & Watson
ATTORNEYS

CONTINUOUS WEBS

INVENTORS
Desmond Walter Molins
Tom Rowlands
BY Watson, Cole, Grindle, + Watson
ATTORNEYS INVENTORS
Desmond Walter Molins
Tom Rowlands
BY
Watson, Cole, Grindle + Watson
ATTORNEYS INVENTORS
Desmond Walter Molins
Tom Rowlands
BY
Watson, Cole, Grindle + Watson
ATTORNEYS INVENTORS
Desmond Walter Molins
Tom Rowlands
BY
Watson, Cole, Grindle + Watson
ATTORNEYS INVENTORS
Desmond Walter Molins
Tom Rowlands
BY
Watson, Cole, Grindle & Watson
ATTORNEYS INVENTORS
Desmond Walter Molins
Tom Rowlands
BY
Watson, Cole, Grindle + Watson
ATTORNEYS United States Patent Office
3,717,537
Patented Feb. 20, 1973

3,717,537

CONTINUOUS WEBS

Desmond Walter Molins and Tom Rowlands, Deptford, England, assignors to Molins Machine Company Limited, London, England Continuation of abandoned application Ser. No. 705,161, Feb. 13, 1968. This application Nov. 30, 1970, Ser. No. 93,873
Claims priority, application Great Britain, Feb. 21, 1967, 8,229/67
Int. Cl. B29d *23/10*
U.S. Cl. 156—466 10 Claims

ABSTRACT OF THE DISCLOSURE

A continuous composite tube of resilient material, for production of cigar or cigarette mouthpieces, is made by continuously slitting one web into two strips, and folding the strips to form an inner and an outer tube respectively, the edges of the outer tube abutting while those of the inner tube may overlap. The width of the strip for the outer tube is controlled and variable to ensure accurate abutment while any resulting width variations in the other strip can be accommodated since the inner tube edges do not abut.

Figure 1:
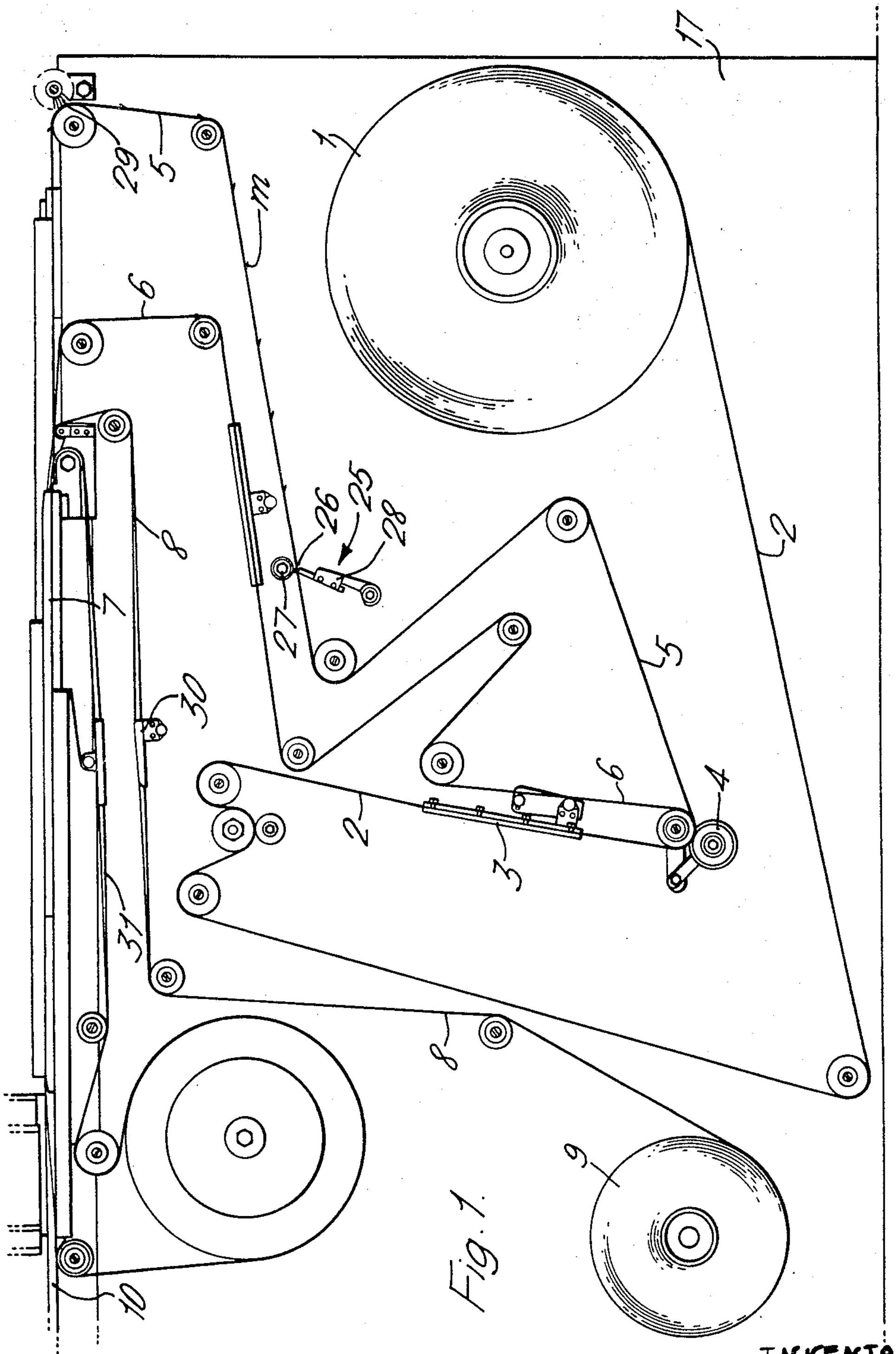

The application is a continuation of Ser. No. 705,161, filed Feb. 13, 1968, now abandoned.

This invention concerns methods of and an apparatus for manufacturing tubes of flexible material such as thin card or stiff paper, and is particularly, though not exclusively, concerned with the continuous production of a tube which is to be cut into suitable lengths which can be used as tubular mouthpieces for cigars, cigarettes or like smoking articles.

An example of such a tubular mouthpiece is disclosed in our copending application and comprises an outer tube formed from a strip of stiff paper or the like, the edges of the strip being abutted, an inner tube formed from a strip of the same kind of material, the longitudinal edges of the strip being non-abutted (e.g. the edge portions overlap each other) and a sealed paper wrapper enclosing the outer tube.

In the manufacture of tubular mouthpieces which are to be joined to cigars or cigarettes, it is important that the diameter of the mouthpieces should be accurately controlled, since otherwise it may be difficult to join them satisfactorily to the smoking articles. This is particularly necessary when the mouthpieces are to be abutted with cylindrical articles, e.g. cigars or cigarettes, and secured to them by encircling bands. Thus in manufacturing mouthpieces of the character disclosed in the above-mentioned application, it is important to control the width of the strip from which the outer tube is formed, in order that the tube shall have the correct diameter while at the same time the edges of the strip are closely abutted. Close abutment of these edges is important to produce a smooth-surfaced mouthpiece which has a pleasing appearance and is smooth to the touch.

In addition it is desirable to be able to vary the width of this strip readily, if a change in diameter of the mouthpiece is required, for example to match different sizes of tobacco rod, or when inaccuracies in diameter of the tubes being produced are to be corrected.

According to the present invention there is provided a process for the production of a continuous composite tube of flexible resilient material such as stiff paper, which composite tube comprises an outer tube made from a strip whose longitudinal edges abut, and an inner tube made from a strip whose longitudinal edges are non-abutting, the process comprising the steps of feeding lengthwise a continuous web, and continuously slitting the web longitudinally at a controlled and variable distance from one of its edges to divide it into an outer strip of accurately controlled width determined by the diameter of the composite tube being made and from which the outer tube is formed, and an inner strip constituting the remainder of the web and from which the inner tube is formed. To take full advantage of the process, webs of uniform width are utilised to produce composite tubes of different diameters by varying the distance from the said one edge of the web at which the web is slit, so as to vary the width of the said outer strip.

Thus the invention enables a web to be produced accurately and consistently from the reels supplied by the material manufacturer, the normal fluctuations being taken up in the second web. In addition, by adjusting the distance at which the web is slit it is possible readily to vary the width of the one web within limits determined by the permissible variation in the width of the other web.

Thus the outer tube can be formed neatly and with a diameter which has been accurately matched to that of the tobacco rod to which it is to be joined, so that the resultant cigar or cigarette has a continuous smooth cylindrical outer surface which gives an attractive appearance and a satisfying feel.

The web may be of such a width in relation to a desired range of width of the said outer strip that within that range the said inner strip is always wider than the first strip so that the edge portions of the said inner tube will overlap each other. Thus the inner tube can be formed with a large or small overlap. Alternatively, it could be formed with no overlap as an incomplete tube, and this wide tolerance makes it possible to use the invention to produce tubes of a relatively wide range of diameters from reels of web of a single width.

Further advantages arise from the invention in that it makes it possible to use a single reel for the production of two webs thus economising on space and machinery cost. This saving is particularly great if automatic reel changing apparatus is used.

The process preferably includes the steps of continuously enclosing the said outer tube in a thin paper wrapper web whose longitudinal edge portions are overlapped and adhesively secured together.

The process may include the steps of continuously feeding the inner strip above the outer strip and the outer strip above the paper web, folding one side of the inner strip to semi-tubular form, then folding the other side of the inner strip together with that of the outer strip to overlap the said one side of the inner strip, then folding the said one side of the outer strip together with that of the paper web about the partially formed tube, and finally gumming the said other side of the paper web at its edge portion and folding it to overlap the said one side of the paper web to complete the tube.

Filter plugs may be fed at spaced intervals on the said inner strip for enclosure within the tube.

The process may further include the steps of slitting the inner strip at spaced intervals to form flaps, and raising the flaps to an upstanding position to form lugs which in the completed tube project inwardly. Where filter plugs are fed on to the inner strip, they may be fed into engagement with the said lugs and thereby accurately located on the strip.

Further according to the invention there is provided apparatus for producing a continuous composite tube of flexible resilient material such as stiff paper, comprising means to feed lengthwise a continuous web of said material, slitting means to slit the web longitudinally continuously to divide it into an outer strip and an inner strip, guide means to guide the web towards said slitting means, the guide means being adjustable to vary and accurately control the width of the outer strip, means to superimpose the two strips one on the other, means to fold the strips into a composite tube comprising an outer tube formed from the outer strip whose longitudinal edges are abutted, and an inner tube formed from the inner strip whose longitudinal edges are non-abutting, and means to enclose the said composite tube in a thin paper wrapper.

The said guide means may include a guide element to engage one edge of the web which will be an edge of the said outer strip, and arranged to maintain continuous contact between the said guide element and the said edge so as to ensure that the web is slit at a predetermined distance from said edge. The guide means is adjustable laterally of the path of the web to vary the distance from the said edge at which the web is slit and hence to vary the width of the said outer strip.

The apparatus further includes cutting means arranged to slit the inner strip at spaced intervals to form flaps, for example V shaped flaps, and means to engage the said flaps and raise them to an upstanding position to form lugs which in the completed tube project inwardly.

There may further be provided means to feed filter plugs at spaced intervals onto the said inner strip for enclosure within the tube. In that case the means to feed filter plugs onto the inner strip, and the cutting means to form flaps in the inner strip, may be timed relatively to each other so that each filter plug is fed into engagement with an upstanding lug and is thereby accurately located on the strip.

The apparatus preferably includes means to feed the inner strip, the outer strip and a thin paper web in superimposed relationship with the outer strip located between the inner strip and the paper web, and may comprise first folding means to fold one side of the inner strip to semi-tubular form, second folding means to fold the other side of the inner strip, together with the corresponding side of the outer strip, to overlap the said one side of the inner strip, third folding means to fold the said one side of the outer strip together with the corresponding side of the paper web about the partially formed tube, gumming means to gum the said other side of the paper web at its edge portion, and fourth folding means to fold the gummed side of the paper web over the said one side of the paper web to form the paper wrapper and complete the tube.

An embodiment of the invention will now be described, by way of example, with reference to the accompanying drawings in which:

FIG. 1 is an elevation of a machine for making tubular mouthpieces for cigars or cigarettes.

Figure 2A:
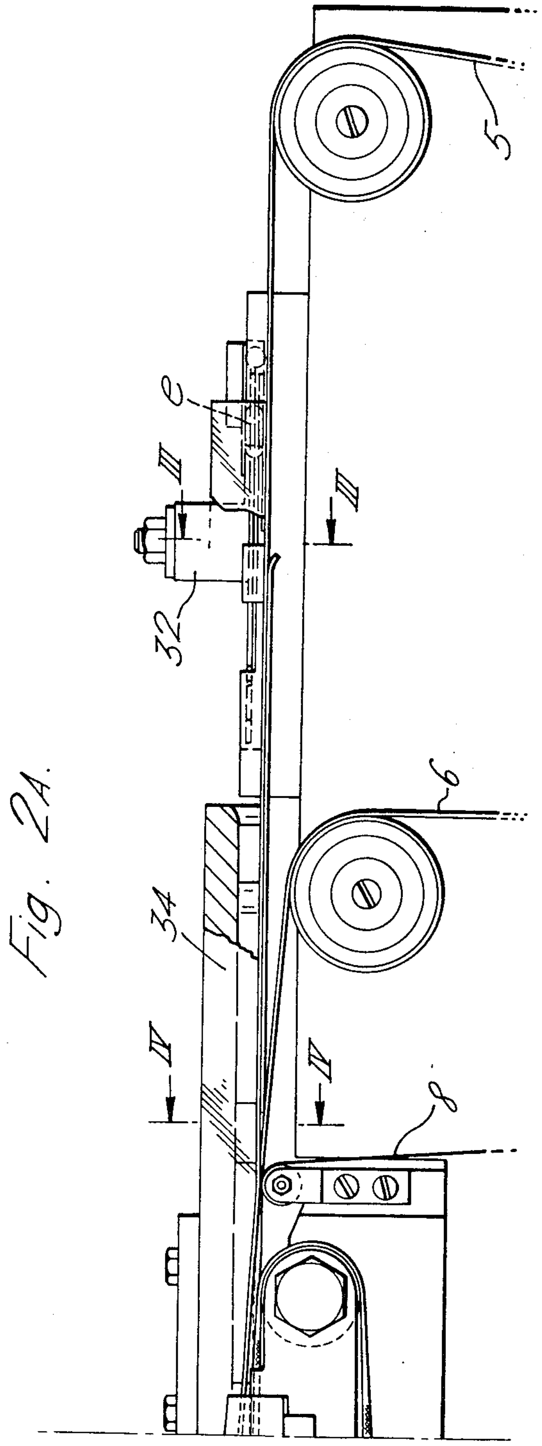
Figure 2B:
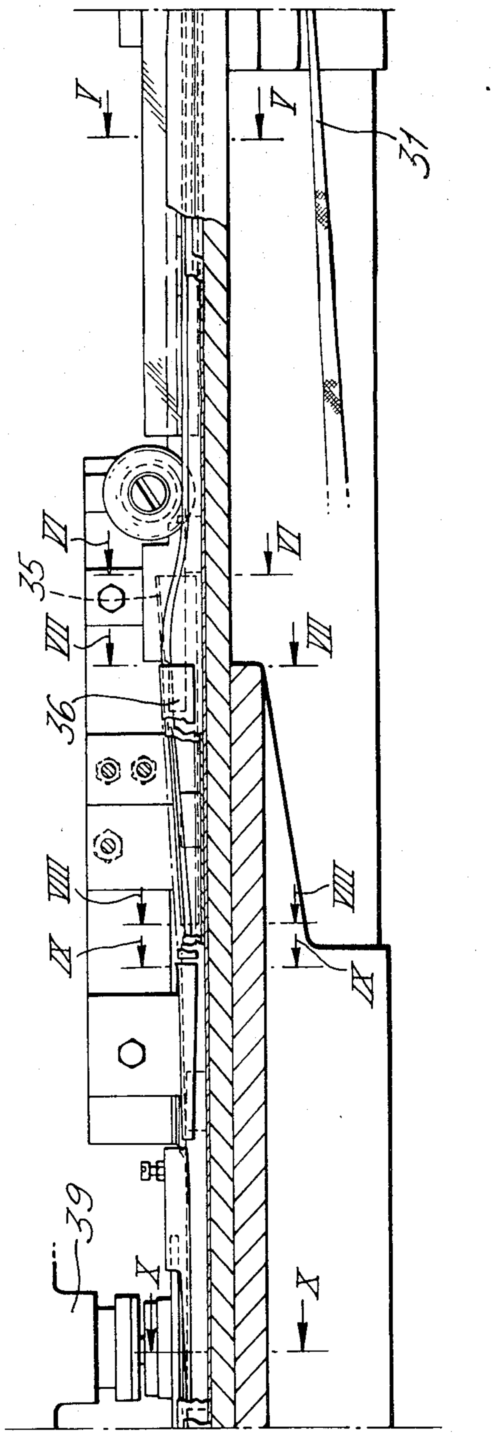
Figure 2C:
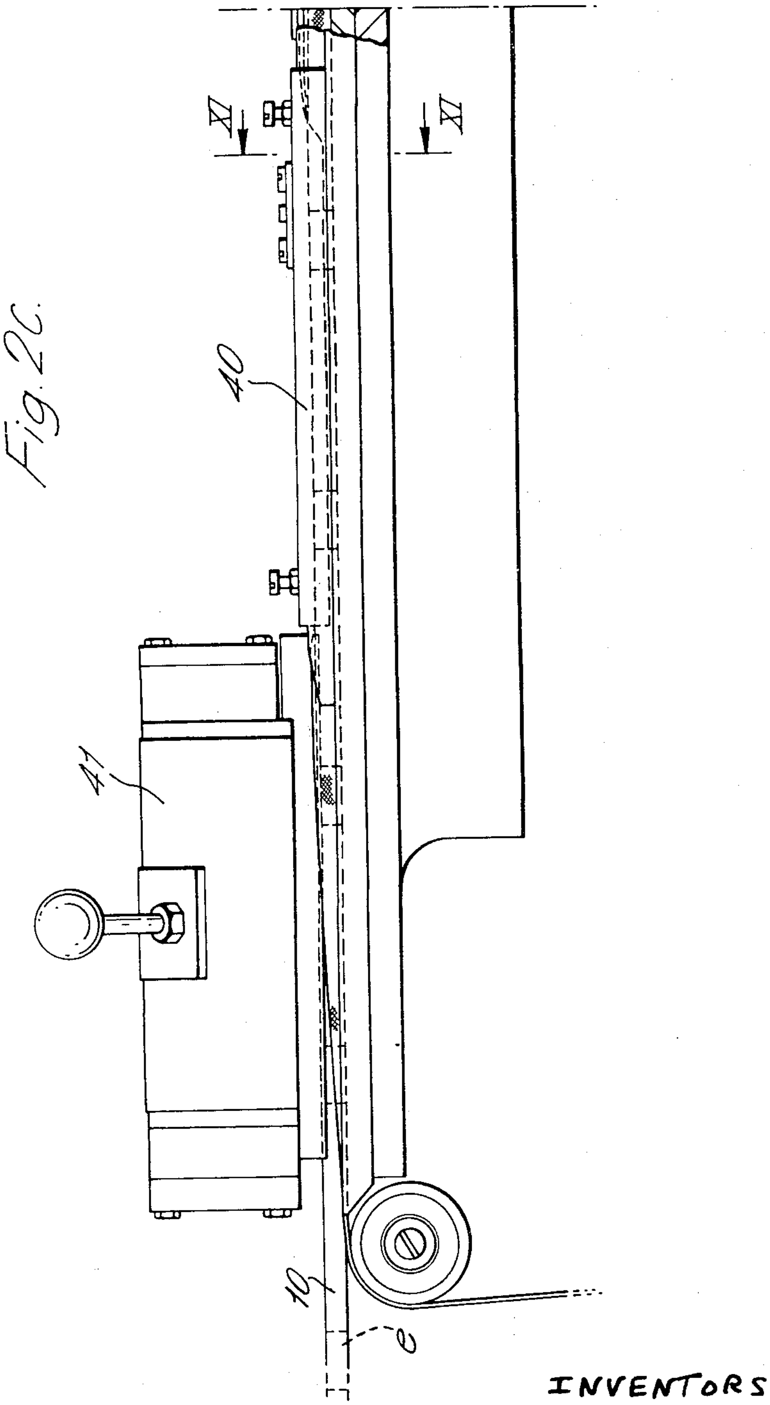
Figure 11:
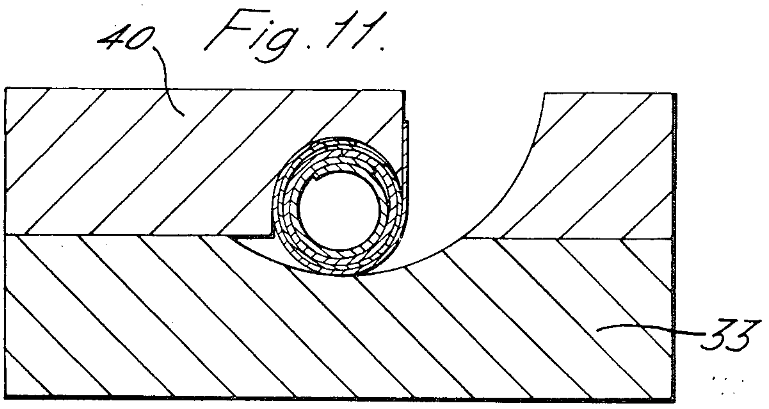
Figure 12:
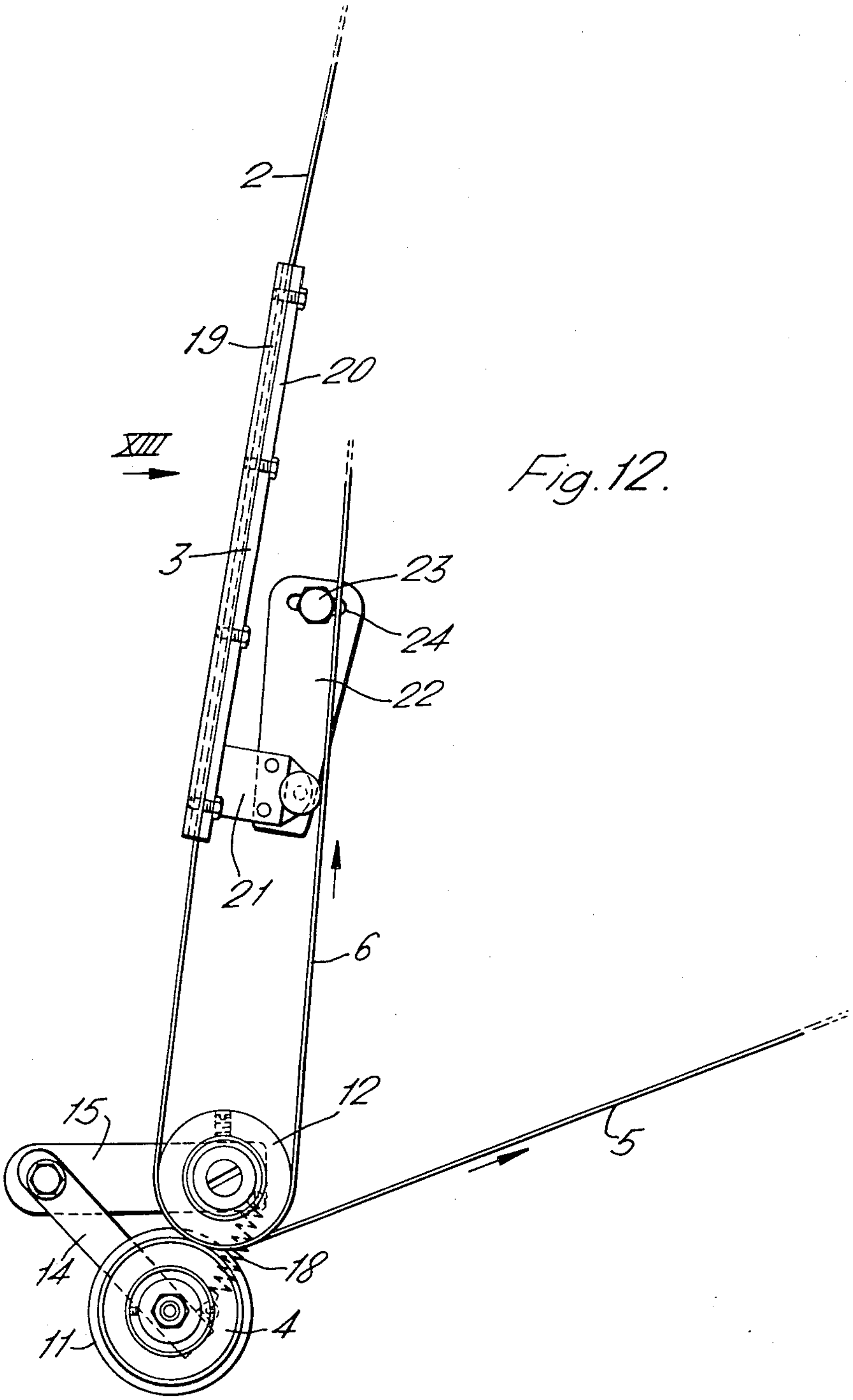
Figure 13:
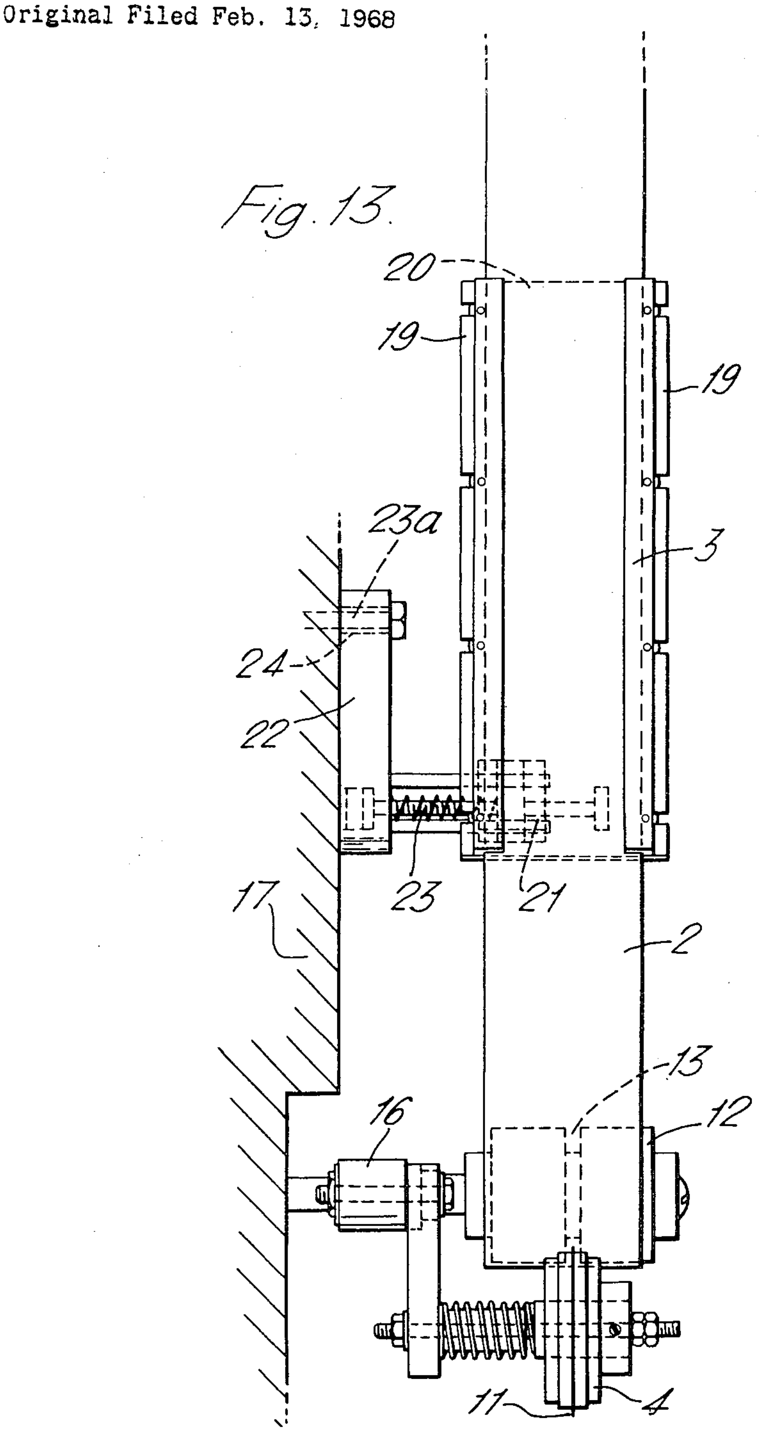
Figures 14, 15:
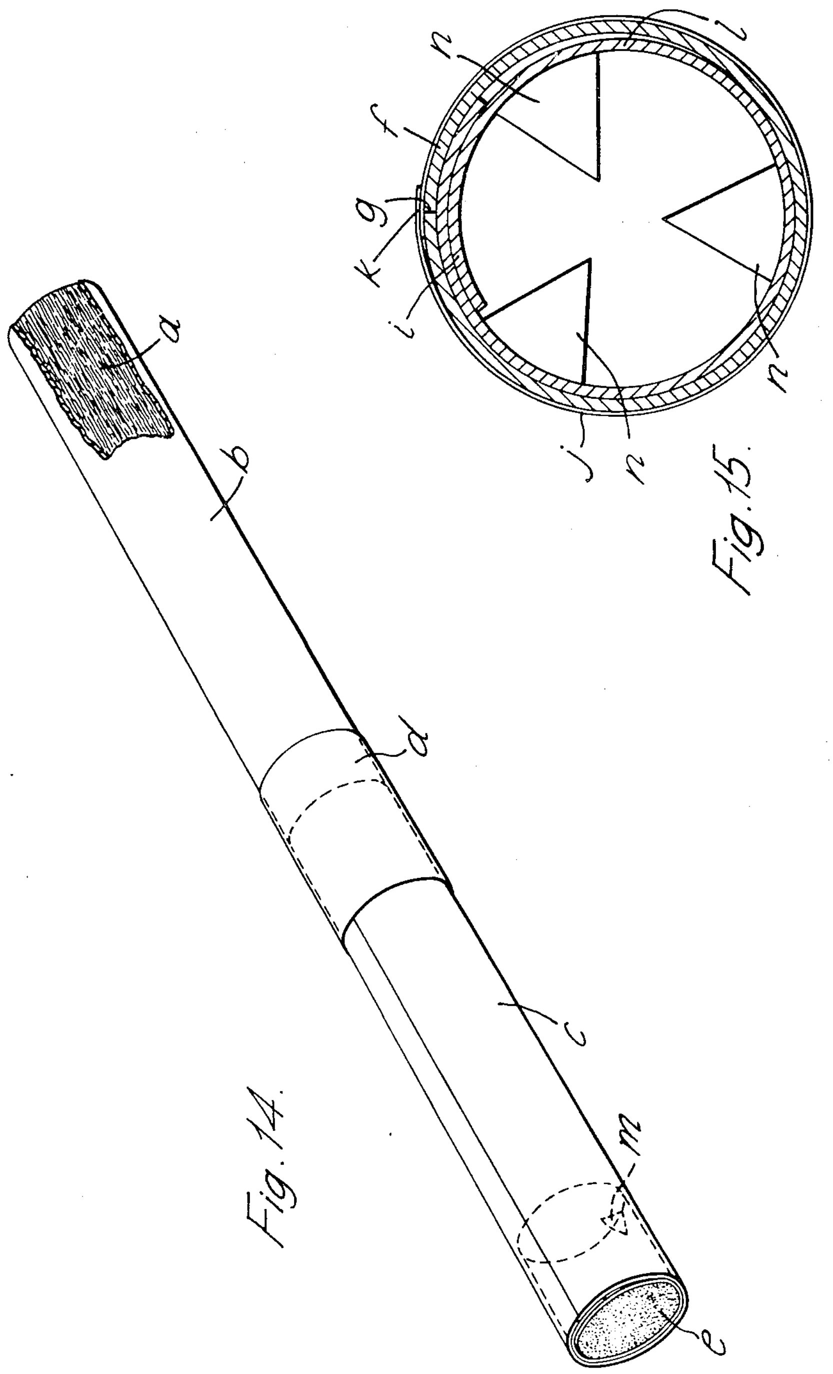

FIGS. 2A, 2B and 2C together constitute an enlarged view showing in more detail a garniture, being a part of the machine of FIG. 1, FIGS. 3 to 11 are sections along the lines III—III to XI—XI respectively of FIGS. 2A, 2B and 2C, FIG. 12 is an enlarged view showing in more detail a knife and a web guide being parts of the machine of FIG. 1, FIG. 13 is a view in the direction of the arrow XIII of FIG. 12, FIG. 14 is a perspective view of a cigar having a mouthpiece formed on the machine, and FIG. 15 is a schematic sectional view of that mouthpiece.

In order that the function of the machine may be more clearly understood, reference will firstly be made to FIGS. 14 and 15. The cigar shown has a tobacco rod comprising a tobacco filler *a* encased in a wrapper *b* formed of reconstituted tobacco and is provided with a tubular mouthpiece *c* secured to the rod by a band *d* of gummed tipping paper. The mouthpiece *c* (FIG. 15) comprises an outer tube *f* formed with a butt joint *g* and an inner tube *h* having a lapped joint *i* and has a filter plug *e* situated at one end remotely from the filler *a*. Neither of these joints is gummed although the lapped joint *i* could be gummed to strengthen the mouthpiece. The tubes *f* and *h* are encased in a retaining wrapper *j* of thin paper having a gummed seam *k*. Both the tubes *f* and *h* are formed of thin card which is resilient. An upstanding lug *m* is cut out of the tube *h* to locate the plug in position lengthwise of the cigar. Alternatively, a group of lugs *n*, FIG. 15, equally spaced around the tube, may project inwardly of the tube to prevent the risk of burning tobacco being drawn through the tubular mouthpiece; this arrangement can advantageously be used if no filter plug is contained in the mouthpiece.

Referring particularly to FIG. 1, the machine comprises a mounting for a reel 1 of thick paper or thin card from which a primary web 2 is continuously drawn over rollers and through a guide 3 to a roller knife 4 which slits the primary web 2 into an inner secondary web 5 and an outer secondary web 6 which are fed into a garniture 7, together with a paper wrapper web 8 from a reel 9, where they are formed into a continuous tube 10. The secondary webs 5 and 6 will for convenience be referred to as "strips" to distinguish them from the primary web 2, and the strip which is to form the inner tube will be called the "inner strip," while that which forms the outer tube will be called the "outer strip."

In the mouthpiece tube the outer strip 6 is formed into the outer tube *f* (FIGS. 14 and 15) with a butt joint *g*, the inner strip 5 is formed into the inner tube *h* within the outer tube *f* and having a lapped joint *i*, and the paper web 8 is lapped and sealed around the outside of the outer tube to form the retaining wrapper *j*.

The construction of the knife and guide is shown clearly in FIGS. 12 and 13 from which it can be seen that the knife 4 has a circumferential, radially raised cutting edge 11 and cooperates with a counter roller 12 which is formed with a corresponding circumferential slot 13, to grip and cut the web 2. Both the knife 4 and the counter-knife 12 are journalled on the ends of arms 14 and 15 respectively which are secured via a boss 16 to a main frame 17 of the machine and are urged towards one another by a spring 18.

The guide 3 comprises a pair of slotted runners 19, carried on a support plate 20, which receive the longitudinal edges of the web 2, and is supported on the frame 17 by means of brackets 21 and 22. These brackets 21 and 22 are interconnected by means of a screw 23, operation of which provides adjustment of the position of the guide 3 transversely of the web, thereby adjusting the position of the web relative to the knife 4 and thence the position at which the web 2 is slit and the resultant widths of the strips 5 and 6. The web 2 is a fairly close fit in the slide, although sufficient play is allowed to take up the tolerance in the web width, and because of this the web 2 is biased to run with its right-hand edge, as viewed in FIG. 13 (which will be an edge of the outer strip 6), abuttng its runner 19 continuousy. Bracket 22 is secured to the frame 17 by a bolt 23*a* extending through a slot 24 and this arrangement enables the guide 3 to be swung into a position where the web 2 is riding over it, thus ensuring that it is effective in guiding the web. It is also adjusted and the web 2 is directed so that its right-hand edge, as viewed in FIG. 13 bears against its runner 19 thus ensuring that the knife 4 cuts the web at a pre-set distance from that edge and that the outer strip 6, which forms the outer, butted tube of the mouthpiece, is of a constant, accurately known width.

The lug *m* for positioning the plugs *e* is formed in the inner strip 5 by a nipping device 25 (FIG. 1) which comprises knife 26 having a V-shaped cutting edge mounted for rotation on a shaft 27 at a rate which is determined according to the spacing required between the lugs *m*, and cutting against an anvil 28 to produce successive flaps which can be raised to constitute the upstanding lugs. A brush 29 is positioned at the approach to the garniture 7 to raise the flaps in to an upstanding position. Alternatively the device 25 may comprise three knives arranged to cut three suitably spaced V-shaped flaps across the width of the web, to produce the lugs *n*.

A guide 30 is positioned on the final travel of the paper web 8 to bow it and position it laterally.

Referring now also to FIGS. 2 to 11, the strips 5, 6 and paper web 8 are led over rollers, into the garniture 7 to lie one on top of the other, being conveyed by an endless travelling garniture tape 31 which is flexible laterally to take the shape of the tube 10 as it is formed. As the inner strip 5 is run into the garniture 7, filter plugs *e* are fed on to it, one to each lug *m*, by a plug feed apparatus 32. A brush, which is not shown, pushes the plugs *e* back against their respective lugs *m*.

In an alternative arrangement the filter plug feed apparatus is omitted, and in that case the strip 5 is provided with groups of lugs *n* instead.

In the garniture 7 the strips 5, 6 and paper web 8 are advanced by the garniture tape 31 between a support bed 33 and a series of guides and folders which progressively adopt the shape of a tube and fold the various webs into the configuration shown in FIG. 15. The details of this operation can be appreciated by considering the successive sectional views of FIGS. 3 to 11 in relation to the main FIGS. 2A, 2B and 2C.

Figure 3:
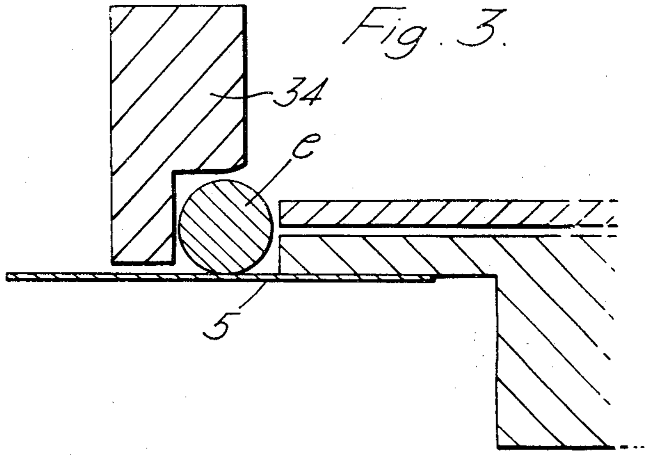
Figure 4:
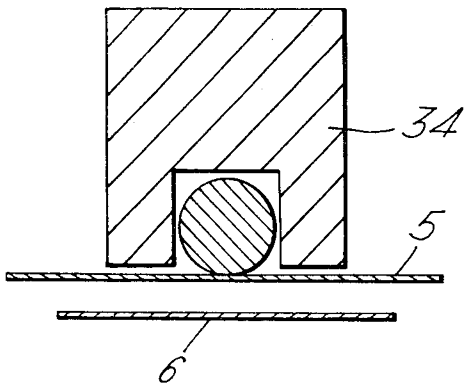
Figure 5:
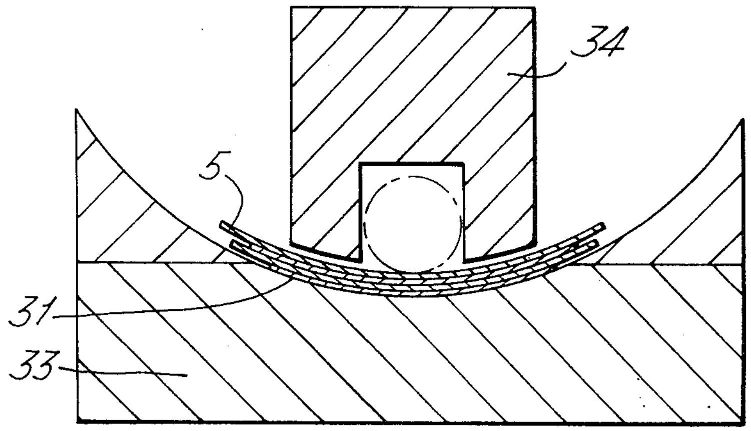

FIG. 3 shows the strip 5 on which a plug *e* has just been deposited, and a top guide 34 which serves to control the plugs. In FIG. 4, the strip 6 has been introduced, beneath strip 5. FIG. 5 shows the strips 5 and 6, and beneath them the paper web 8 and garniture tape 31 suported on the bed 33.

Figure 6:
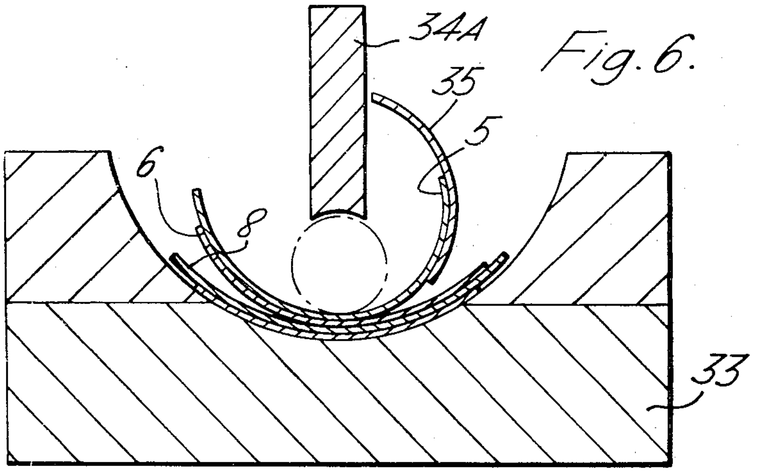
Figure 7:
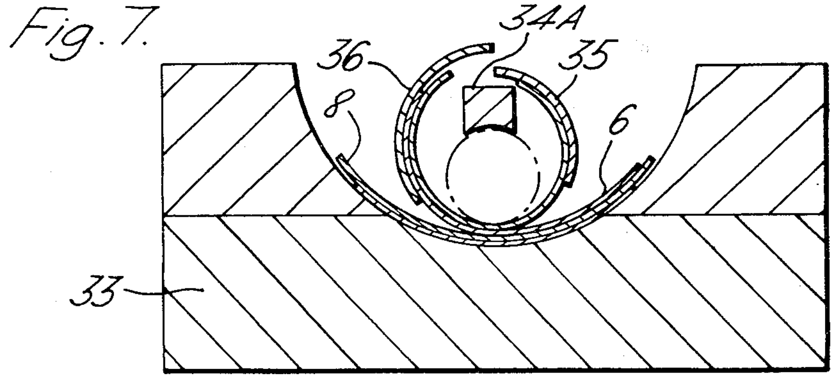
Figure 8:
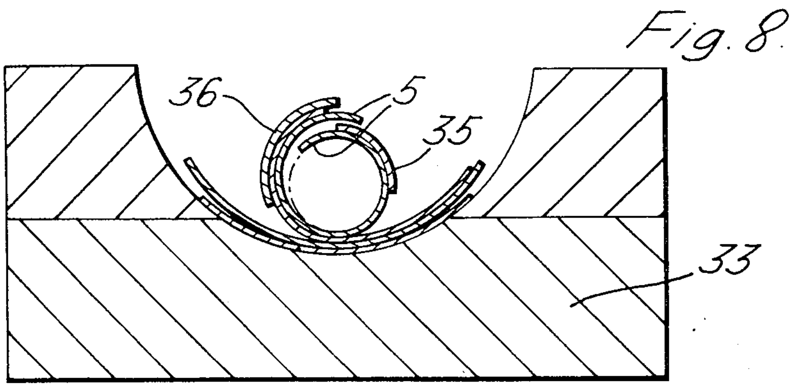

FIG. 6 illustrates the next stage, at which the right-hand side (as viewed in the figure) of the strip 5 is engaged by a first folding device 35 which commences the folding operations by engaging the edge portion of the strip (which being wider than strip 6 extends beyond it) and raising it. A further plug guide 34A controls the plugs. The folder 35 progressively folds the right hand side of strip 5 inwardly, as shown in FIGS. 7 and 8, until it lies against the plugs *e* (shown in dotted lines in FIGS. 5–8). Meanwhile a second folder 36 (FIGS. 7 and 8) engages the left-hand side of the strip 6 and progressively folds it and the superimposed part of strip 5 until the latter overlaps the right-hand edge portion of strip 5, as shown in FIG. 8.

Figure 9:
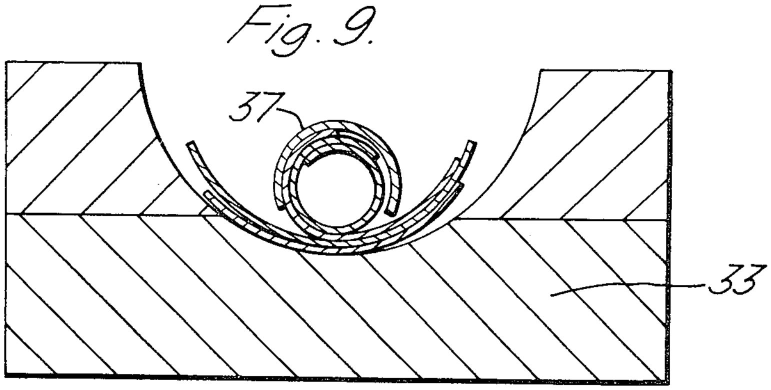
Figure 10:
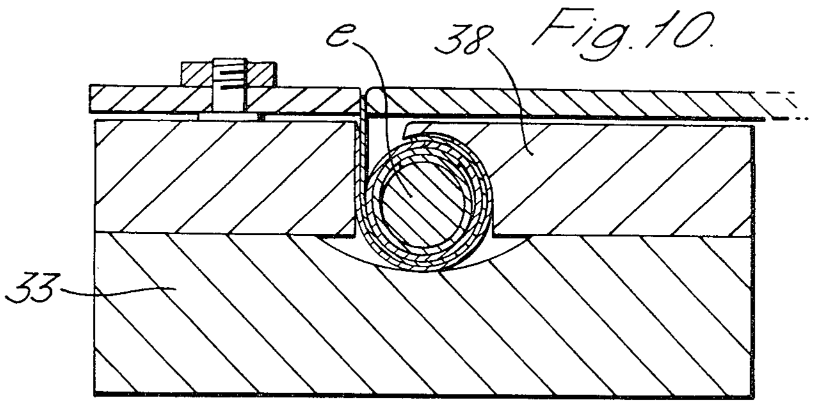

The partially folded strips (i.e. the right-hand side of strip 5 and the left-hand sides of strips 5 and 6) then pass under a compression tongue 37, see FIG. 9, which progressively reduces somewhat the diameter of the partly formed tube, the overlapped edge portions of the strip 5 sliding over each other. The left-hand sides of the paper web 8 and garniture tape 31, and the right-hand sides of the latter and also of the strip 6, are outside the tongue as shown in FIG. 9. These right-hand sides are then engaged by a folder 38 which folds them over the tongue, while at the left-hand side the paper web is guided to an upright position to be engaged by a paste-wheel 39 (FIG. 10) which applies paste to its extreme edge portion. The next stage is illustrated in FIG. 11; the left-hand side of the paper web 8 has now been folded down and lapped over the right-hand edge, by a folder 40, and the formation of the tube is complete. The tube then passes beneath a heater 41 which dries the seam in the usual way.

The plugs *e* are double length plugs inserted at a spacing of one to every two mouthpiece lengths and the tube 10 is then cut up into double lengths either through the plugs *e* or midway therebetween, depending upon whether the plug *e* is to be positioned adjacent to or remote from the tobacco rod *a*. These double lengths can then be assembled with tobacco rods in any convenient way. For example a double length of tube can be placed endwise between two single length tobacco rods and joined to them by bands *d*, the resulting assemblage then being subdivided by cutting through the double-length tube. Alternatively, the tube may be cut initially into single lengths, and two such single lengths joined to an intermediate double-length tobacco rod, which is finally cut in half.

If desired the web 5 can be gummed to seal the plug *e* in position.

As stated above, the filter plugs may if desired be omitted, in which case groups of lugs *n* are provided instead of lugs *m*, and the plug-feeding apparatus, as well as the plug guides 34 and 34A, can be omitted.

We claim:

1. Apparatus for producing a continuous composite tube of flexible resilent material, such as stiff paper, comprising means to feed lengthwise a continuous web of said material, slitting means to slit the web longitudinally continuously to divide it into an outer strip and an inner strip, guide means to guide the web towards said slitting means, said guide means being adjustable to vary and accurately control the width of the outer strip, means to superimpose the two strips one on the other, and means to fold the strips into a composite tube comprising an outer tube formed from the outer strip whose longitudinal edges are abutted and an inner tube formed from the inner strip whose longitudinal edges are non-abutting, and means to secure the inner and outer tubes together.

2. Apparatus according to claim 1, wherein said guide means comprises a guide element for engaging one edge of the web which will be an edge of said outer strip and located to maintain continuous contact between said guide element and said edge so as to ensure that the web is slit at a predetermined distance from said edge.

3. Apparatus according to claim 2, wherein said guide means comprises means for laterally adjusting said guide element with respect to the path of the web to vary the distance from said edge at which the web is slit and hence to vary the width of the said outer strip.

4. Apparatus according to claim 1, comprising cutting means arranged to slit the inner strip at spaced intervals to form flaps and means to engage the said flaps and raise them to an upstanding position to form lugs which in the completed form project inwardly.

5. Apparatus according to claim 4, comprising means to feed filter plugs at spaced intervals on to said inner strip for enclosure within the tube.

6. Apparatus according to claim 5, wherein means is provided to time the means to feed filter plugs on to the said inner strip and the cutting means to form flaps in the inner strip relatively to each other so that each filter plug is fed into engagement with an upstanding lug and is thereby accurately located on the strip.

7. Apparatus according to claim 1, comprising means to feed the inner strip, the outer strip and a thin paper web in superimposed relationship with the outer strip located between the inner strip and the paper web.

8. Apparatus according to claim 7, comprising first folding means to fold one side of the inner strip to semi-tubular form, second folding means to fold the other side of the inner strip, together with the corresponding side of the outer strip, to overlap the said one side of the inner strip, third folding means to fold the said one side of the outer strip together with the corresponding side of the paper web about the partially formed tube, gumming means to gum the said other side of the paper web at its edge portion, and fourth folding means to fold the gummed side of the paper web over the said one side of the paper web to form the paper wrapper and complete the tube.

9. Apparatus according to claim 1, comprising cutting means arranged to slit the inner strip at spaced intervals to form flaps, means to engage said flaps and raise them to an upstanding position to form lugs, means to feed filter plugs onto said inner strip, and means for timing said cutting means and feed means relatively to each other so that each filter plug is fed into engagement with an upstanding lug and is thereby accurately located on the strip.

10. Apparatus as defined in claim 1, wherein said means to secure the inner and outer tubes together comprises means to enclose the composite tube in a thin paper wrapper.

References Cited

UNITED STATES PATENTS

| | | | |
|---|---|---|---|
| 1,864,764 | 6/1932 | Rundell | 156—519 |
| 2,204,369 | 6/1940 | Leary | 156—519 |
| 2,649,131 | 8/1953 | Lincoln | 156—197 |
| 3,323,964 | 6/1967 | Young | 156—203 |
| 3,332,138 | 7/1967 | Garner | 156—203 |
| 3,392,073 | 7/1968 | Schenk et al. | 156—203 |

DOUGLAS J. DRUMMOND, Primary Examiner

U.S. Cl. X.R.

156—467, 510, 412, 519